United States Patent
Jones et al.

(10) Patent No.: US 11,884,880 B2
(45) Date of Patent: Jan. 30, 2024

(54) SURFACTANT COMPOSITIONS COMPRISING SOLID SUBSTRATES FOR SUBTERRANEAN WELL OPERATIONS

(71) Applicant: Halliburton Energy Services, Inc., Houston, TX (US)

(72) Inventors: Paul Joseph Jones, Houston, TX (US); Amlan Datta, Houston, TX (US); Brittany Michelle Elbel, Houston, TX (US); Kyriacos Agapiou, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/869,097

(22) Filed: Jul. 20, 2022

(65) Prior Publication Data

US 2022/0356391 A1 Nov. 10, 2022

Related U.S. Application Data

(62) Division of application No. 16/509,574, filed on Jul. 12, 2019, now Pat. No. 11,434,414.

(60) Provisional application No. 62/703,188, filed on Jul. 25, 2018.

(51) Int. Cl.
| | |
|---|---|
| *C09K 8/584* | (2006.01) |
| *C09K 8/40* | (2006.01) |
| *C09K 23/00* | (2022.01) |
| *C09K 23/42* | (2022.01) |
| *C09K 23/02* | (2022.01) |

(52) U.S. Cl.
CPC ............... *C09K 8/584* (2013.01); *C09K 8/40* (2013.01); *C09K 23/00* (2022.01); *C09K 23/02* (2022.01); *C09K 23/42* (2022.01)

(58) Field of Classification Search
None
See application file for complete search history.

(56) References Cited

U.S. PATENT DOCUMENTS

| | | |
|---|---|---|
| 3,850,248 A | 11/1974 | Carney |
| 5,996,692 A | 10/1999 | Chan et al. |
| 6,221,381 B1 | 4/2001 | Shelford et al. |
| 6,258,757 B1 | 7/2001 | Sweatman et al. |
| 6,271,181 B1 | 8/2001 | Chatterji et al. |

(Continued)

FOREIGN PATENT DOCUMENTS

| | | |
|---|---|---|
| EP | 0814232 | 12/2003 |
| JP | 2009126885 | 6/2009 |

(Continued)

OTHER PUBLICATIONS

CN 105531005 Apr. 27, 2016 (Year: 2016).*

(Continued)

*Primary Examiner* — Charles R Nold
(74) *Attorney, Agent, or Firm* — Thomas Rooney; C. Tumey Law Group PLLC

(57) ABSTRACT

A method of preparing a solid surfactant composite may include: coating a liquid water-wetting surfactant on a solid carrier; and drying the solid carrier to produce the solid surfactant composite. A method may include: introducing a (Continued)

spacer fluid into a wellbore, the spacer fluid comprising a solid surfactant composite; and displacing a fluid in the wellbore using the spacer fluid.

13 Claims, 2 Drawing Sheets

(56) References Cited

U.S. PATENT DOCUMENTS

| | | | |
|---|---|---|---|
| 6,302,209 | B1 | 10/2001 | Thompson et al. |
| 6,668,927 | B1 | 12/2003 | Chatterji et al. |
| 7,320,951 | B2 | 1/2008 | Albrecht et al. |
| 10,196,540 | B2 * | 2/2019 | Kanda ................ C09D 133/06 |
| 10,329,472 | B2 | 6/2019 | Halliburton |
| 10,882,751 | B2 | 1/2021 | Shahsavari et al. |
| 2006/0081372 | A1 | 4/2006 | Dealy et al. |
| 2007/0129478 | A1 * | 6/2007 | Nakamura ................ C09D 7/67 |
| | | | 427/407.1 |
| 2008/0135245 | A1 | 6/2008 | Smith et al. |
| 2012/0148826 | A1 | 6/2012 | Kratschmer et al. |
| 2013/0196885 | A1 | 8/2013 | Pabalan et al. |
| 2015/0129217 | A1 | 5/2015 | Vorderbruggen et al. |
| 2016/0024371 | A1 | 1/2016 | Vo et al. |
| 2018/0265763 | A1 * | 9/2018 | Leotaud ................ C09K 8/40 |

FOREIGN PATENT DOCUMENTS

| | | |
|---|---|---|
| WO | 2015/076845 | 5/2015 |
| WO | 2016/140656 | 9/2016 |
| WO | 2017074301 | 5/2017 |

OTHER PUBLICATIONS

International Search Report and Written Opinion for PCT Application No. PCT/US2019/041524 dated Oct. 29, 2019.
D-Air 3000™ and D-Air 3000L™ Defoamer datasheet from Halliburton Energy Services, Inc. dated Feb. 2012, Accessed Jan. 21, 2021.
Non-Final Office Action Summary for U.S. Appl. No. 16/509,574 dated Mar. 17, 2021.
Final Office Action Summary for U.S. Appl. No. 16/509,574 dated Sep. 20, 2021.
Non-Final Office Action Summary for U.S. Appl. No. 16/509,574 dated Feb. 14, 2022.
Notice of Allowance for U.S. Appl. No. 16/509,574 dated May 31, 2022.

* cited by examiner

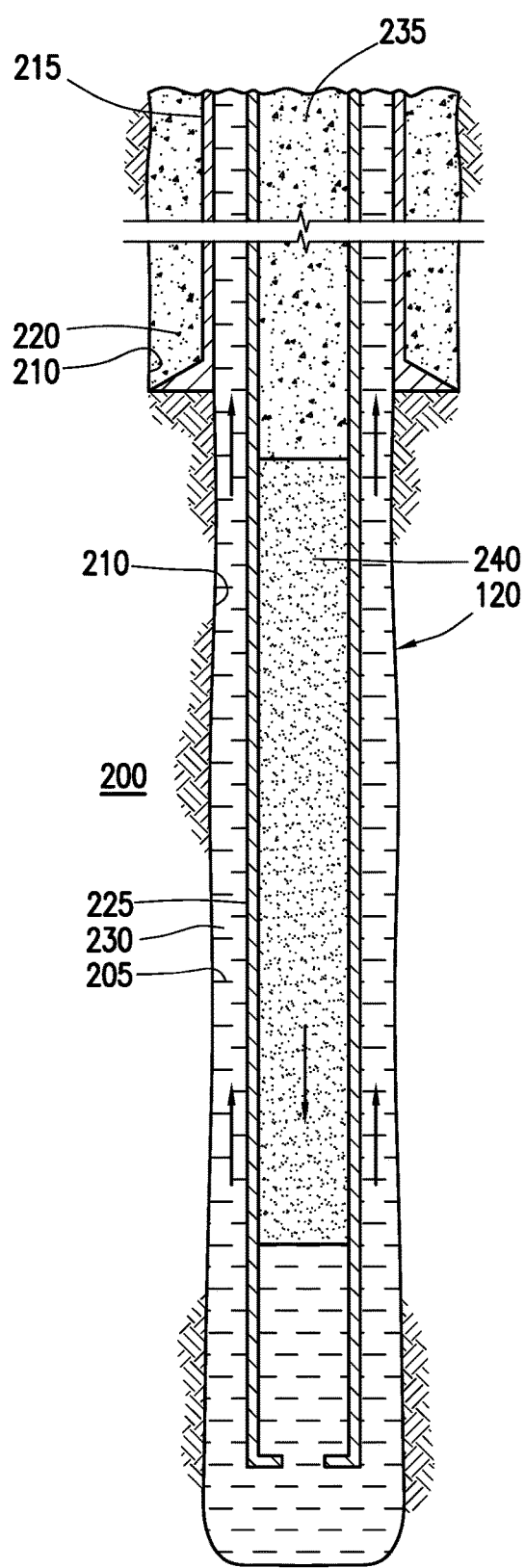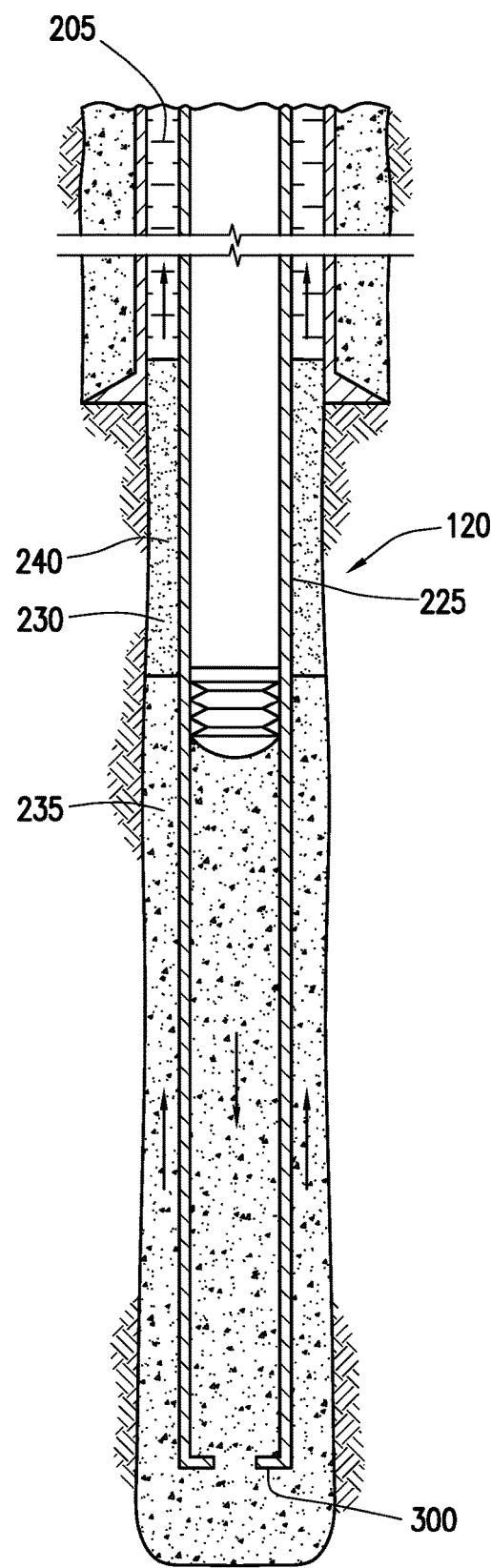

SURFACTANT COMPOSITIONS COMPRISING SOLID SUBSTRATES FOR SUBTERRANEAN WELL OPERATIONS

BACKGROUND

The present application is a division of U.S. patent application Ser. No. 16/509,574 filed Jul. 12, 2019, the entirety of which is incorporated herein by reference. 115702

In well cementing operations, such as well construction and remedial cementing, cement compositions are commonly utilized. Cement compositions may be used in primary cementing operations whereby pipe strings, such as casing and liners, are cemented in wellbores. In a typical primary cementing operation, a cement composition may be pumped into an annulus between the exterior surface of the pipe string (e.g., casing, liner, etc.) disposed therein and the walls of the wellbore (or a larger conduit in the wellbore). The cement composition may set in the annular space, thereby forming an annular sheath of hardened, substantially impermeable material (i.e., a cement sheath) that may support and position the pipe string in the wellbore and may bond the exterior surface of the pipe string to the wellbore walls (or the larger conduit). Among other things, the cement sheath surrounding the pipe string should function to prevent the migration of fluids in the annulus, as well as protect the pipe string from corrosion. Cement compositions may also be used in remedial cementing methods, such as in squeeze cementing for sealing voids in a pipe string, cement sheath, gravel pack, subterranean formation, and the like.

Preparation of the wellbore for cementing operations may be important in achieving optimal zonal isolation. Conventionally, wellbores may be cleaned and prepared for the cement composition with a fluid train that precedes the cement composition and can include spacer fluids, flushes, and water-based muds, for example. Spacer fluids may be used in wellbore preparation for drilling fluid displacement before introduction of the cement composition. The spacer fluids may enhance solids removal, prepare surfaces for bonding with cement, and separate the drilling fluid from a physically incompatible fluid, such as a cement composition. Spacer fluids may also be placed between different drilling fluids during drilling change outs or between a drilling fluid and completion brine. A surfactant may be blended with the spacer fluid, for example, to allow the spacer fluid to be compatible with water- or oil-based drilling fluids. Inclusion of the surfactant may enable the spacer fluid to achieve improved cleaning by removal of residual drilling fluid from the wellbore. For wellbores in which oil-based drilling fluids may have been used, the inclusion of surfactants in the spacer fluids may serve the purpose of water-wetting surfaces in the wellbore, such as the wellbore wall and casing surfaces, resulting in better cement bonding.

For cementing operations, whether on land or in subsea operations, addition of liquid surfactants and liquid additives may not be efficient nor adequately controlled. Liquid surfactants may be added to a mix water feed if the spacer fluid is mixed on the fly using a cementing unit. Alternatively, liquid surfactants may be added to a batch mixer after pre-hydration of spacer additives and weighting agents are completed. In both instances, a mixing vessel with agitation and/or recirculation capability is required.

BRIEF DESCRIPTION OF THE DRAWINGS

These drawings illustrate certain aspects of some of the embodiments of the present disclosure, and should not be used to limit or define the invention.

FIG. 2 is a schematic illustration of an example in which a spacer fluid comprising a solid surfactant composite is used between a cement composition and a drilling fluid.

FIG. 3 is a schematic illustration of the embodiment of FIG. 3 showing displacement of the drilling fluid.

DETAILED DESCRIPTION

Figure 1:
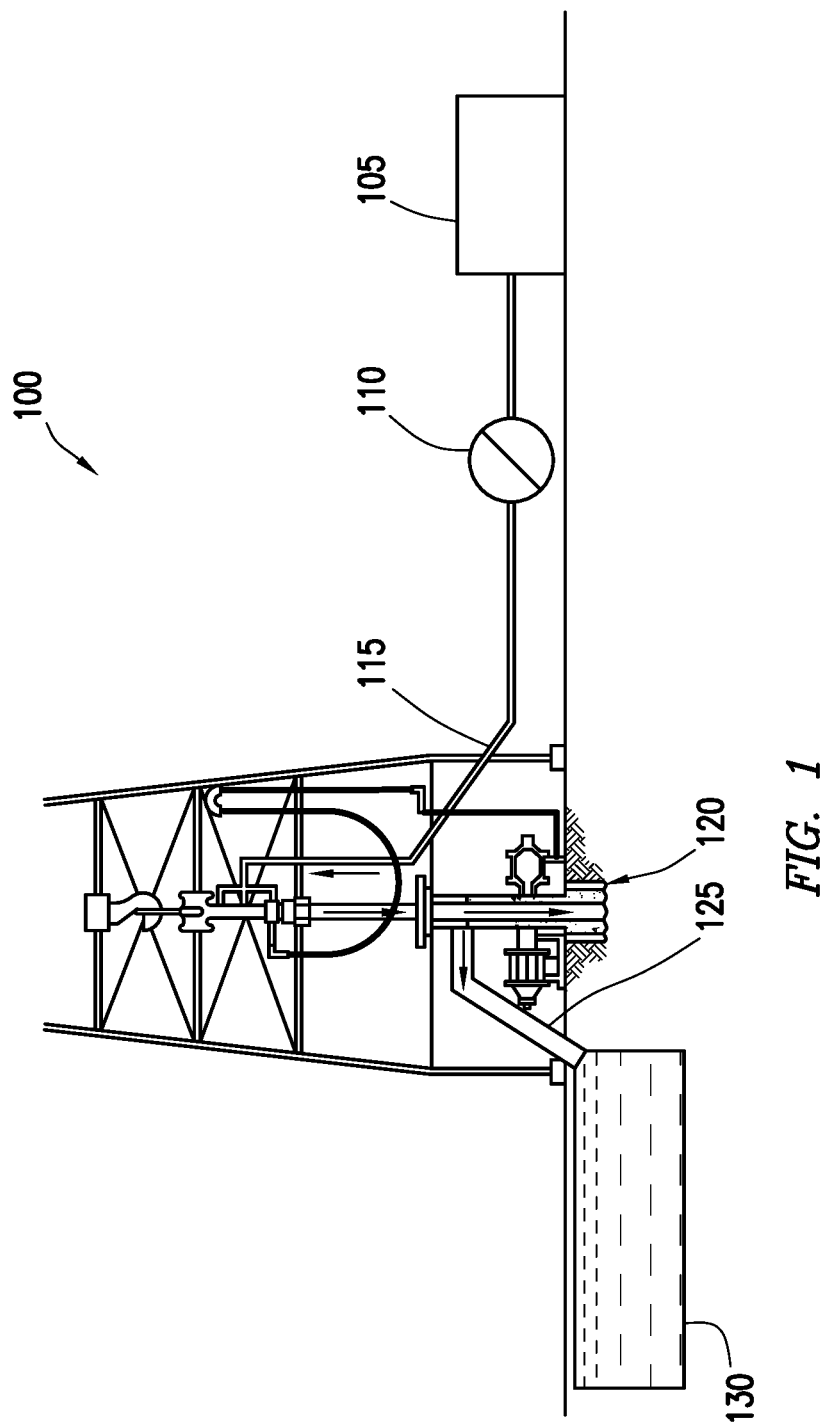
FIG. 1 is a schematic illustration of an example system for the preparation and delivery of a spacer fluid comprising a solid surfactant composite.

Embodiments relate well cementing operations and, more particularly, in certain embodiments, to use of solid surfactant composites in well cementing operations. The well cementing operations may include the use of the solid surfactant composites in spacer fluids used, for example, in well cementing operations. A solid surfactant composite may be dry blended with particulate solids, wherein the dry blend may be included in a spacer fluid. One of the many potential advantages to these methods and compositions is that the use of a solid surfactant composite instead of liquid surfactants may reduce and potentially eliminate the need for additional mixing equipment for the surfactant at the well site, thus simplifying preparation of wellbore treatment fluid such as spacer fluids, cements, pills, lost circulation fluids, or any other wellbore treatment fluids. The use of a dry surfactant such as a solid surfactant composite disclosed herein may reduce complexity of spacer fluid preparation. Solid surfactant composites may be dry blended with particulate solids and weighting agents at a bulk plant which may then be mixed on the fly at a well site without the need for additional mixing vessels to mix a liquid surfactant.

A solid surfactant composite may include a water-wetting surfactant and a solid carrier. Optionally, the solid surfactant composite may include a dispersant, a defoaming agent, or a combination thereof. The solid surfactant composite may have a wide variety of shapes and sizes of individual particles suitable for use in a particular wellbore application. By way of example, individual particles of the solid surfactant composite may have well-defined physical as well as irregular geometries, including the physical shape of platelets, shavings, fibers, flakes, ribbons, rods, strips, spheroids, hollow beads, toroids, pellets, tablets, or any other physical shape. Without limitation, the solid surfactant composite may have a particle size in the range of about 5 microns to about 1,500 microns and, alternatively, a particle size in the range of about 20 microns to about 500 microns. However, particle sizes outside these defined ranges also may be suitable for particular applications.

Any of a variety of water-wetting surfactants may be included in the solid surfactant composite that may be capable of water-wetting well surfaces, such as the wellbore wall and casing surface. In some examples, the water-wetting surfactant may be in a liquid form, referred to as a liquid water-wetting surfactant, which may be dried on a particle. The function that a particular surfactant may perform depends on a variety of factors. These factors may include, but are not limited to, the choice of the hydrophobic and hydrophilic portions and the relative amounts thereof and the presence of any cationic, ionic, non-ionic, amphoteric, or Zwitterionic groups. The water-wetting surfactant may be included in the solid surfactant composite in an amount, without limitation, of from about 5% to about 99.9% by weight of the solid surfactant composite. By way of example, the water-wetting surfactant may be included in an amount of from about 5%, about 10%, about 20%, about 30%, about 40%, about 50%, about 60%, about 70%, about 80%, about 90%, or about 99.9% by weight of the solid surfactant composite. The water-wetting surfactants may be ionic, non-ionic, amphoteric, zwitterionic, or any combinations thereof. Examples of suitable water-wetting surfactants may include, but are not limited to, homo- and hetero-polymers of alkylene oxides, branched chain alcohol ethoxylates, C6-C10 alcohol ethoxylate sulfate ammonium salts, ethoxylated nonylphenols, poly(oxy-1,2,-ethanediyl) alpha-sulfo-omega-(dodecyloxy) ammonium salt, poly(oxy-1,2-ethanediyl) alpha-sulfo-omega-(tetradecyloxy) ammonium salt, ethylene glycol monobutyl ether, ethoxylated hexanol, 1-methoxy-2-propanol, 2-methoxy-1-propanol, C9-C11 alkyl oligomeric d-glucopyranoside, and C9-C11 ethyxylated alcohols.

Other suitable water-wetting surfactants may include alcohol ethoxysulfates, alkyl phenol ethoxylates (e.g., nonyl phenol ethoxylates), glycol ethers, and combinations thereof. Certain of the water-wetting surfactants may be used as water-soluble salts. For example, the water-wetting surfactants may be selected from alkali metal, alkaline earth metal, ammonium, and alkanolammonium salts of alcohol ethoxylates, alcohol ethoxysulfates, and alkyl phenol ethoxylates.

Without limitation, suitable alcohol ethoxylates may include $C_6$ to $C_{16}$ alcohols substituted with from about 2 moles to about 15 moles and, alternatively, from about 5 moles to about 12 moles of ethylene oxide. The $C_6$ to $C_{15}$ alcohols may be linear or branched. Without limitation, suitable alcohol ethoxylates may include $C_4$ to $C_8$ alcohols substituted with about 4 moles to about 8 moles of ethylene oxide, $C_8$ to $C_{12}$ alcohols substituted with about 4 moles to about 8 moles of ethylene oxide, and $C_{12}$ to $C_{14}$ alcohols substituted with about 10 moles to about 14 moles of ethylene oxide. Specific examples of suitable alcohol ethoxylates may include butanol, hexanol or pentanol substituted with 6 moles of ethylene oxide, nonyl, decyl alcohol, or dodecyl alcohol substituted with 6 moles of ethylene oxide, or docecyl alcohol, tridecyl alcohol, or tetradecyl alcohol substituted with 12 moles of ethylene oxide. Additional examples of suitable alcohol ethoxylates may include isodecyl alcohol substituted with 6 moles of ethylene oxide or isotridecyl alcohol substituted with 12 moles ethylene oxide. Combinations of suitable alcohol ethoxylates may also be used.

Without limitation, suitable alcohol ethoxysulfates may include $C_{10}$ to $C_{16}$ alcohols substituted with about 2 moles to about 15 moles of ethylene oxide. The $C_{10}$ to $C_{16}$ alcohols may be linear or branched. Suitable $C_{10}$ to $C_{16}$ alcohol ethoxylates may include docecyl alcohol, tridecyl alcohol, or tetradecyl alcohol substituted with from 2 moles to about 15 moles and, alternatively from about 6 moles to about 12 moles of ethylene oxide. Additional examples of suitable alcohol ethoxylates may include ethoxylated dodecyl alcohol ammonium sulfate or ethoxylated tetradecyl ammonium sulfate. Combinations of suitable alcohol ethoxysulfates may also be used.

Without limitation, suitable alkyl phenol ethoxylates may include an alkyl group with from 1 to 12 carbon atoms and, alternatively, from about 8 to 12 carbon atoms. The alkyl phenol ethoxylates may have from 2 moles to about 18 moles of ethylene oxide and, alternatively, from about 8 moles to about 12 moles of ethylene oxide. One example of a suitable alkyl phenol ethoxylate is nonyl phenol ethoxylate having from about 8 moles to about 12 moles of ethylene oxide and, alternatively, about 10 moles of ethylene oxide.

Without limitation, suitable glycol ethers may include an alkyl ether of a mono-, di-, or triethylene glycol. The alkyl ether may include a $C_1$ to $C_5$ alkyl ether of a mono-, di-, or triethylene glycol. By way of example, the glycol ether may include diethylene glycol methyl ether, dipropylene glycol methyl ether, 2-butoxy ethanol, ethers of a $C_2$ to $C_6$ dihydric alkanol that include at least one $C_1$ to $C_6$ alkyl group, mono ethers of dihydric alkanols, methoxypropanol, butoxyethanol, hexoxyethanol, isomers thereof, and combinations thereof. One example of a suitable glycol ether may include ethylene glycol monobutyl ether. The glycol ethers may be used by themselves in the solid surfactant composite or as a co-surfactant with one or more of the additional water-wetting surfactants described herein. Without limitation, a glycol ether such as ethylene glycol monobutyl ether may be used as a co-surfactant (50% to 90% by weight) with an alcohol ethoxylates, such as butanol, hexanol or pentanol substituted with from 4 moles to about 8 moles and, alternatively, about 6 moles of ethylene oxide.

As previously described, the water-wetting surfactant may be disposed on a solid carrier. Without limitation, the solid carrier may include any of a variety of solid materials, such as fly ashes, natural glasses, metal silicates such as aluminosilicates, alkali silicates, and alkali earth silicates, metal carbonates such as alkali carbonates and alkali earth carbonates, synthetic glass, biomass ash, diatomaceaous earth, cement kiln dust, lime kiln dust, Portland cement, non-Portland cements such as aluminate cement, and combinations thereof. Some specific solid carriers may include calcium silicate, calcium carbonate, metakaolin, volcanic glass, gypsum, porous alumina, zeolite, porous silica, silica fume, fumed silica, micro fine silica, silica flour, and combinations thereof. The solid carrier may be included in the solid surfactant composite in an amount, without limitation, of from about 0.1% to about 95% by weight of the solid surfactant composite. By way of example, the solid carrier may be included in an amount of from about 0.1%, about 10%, about 20%, about 30%, about 40%, about 50%, about 60%, about 70%, about 80%, about 90%, or about 95% by weight of the solid surfactant composite.

Optionally, the solid surfactant composite may include a dispersant. Without limitation, suitable dispersants may include any of a variety of commonly used cement dispersants, such as sulfonated dispersants; sulfonated polymer dispersants; naphthalene sulfonates; melamine sulfonates; sulfonated melamine formaldehyde condensate; sulfonated naphthalene formaldehyde condensate; sulfonate acetone formaldehyde condensate; ethoxylated polyacrylates; or combinations thereof. One example of a suitable dispersant may include a naphthalene sulfonate condensed with from about 4 moles to about 8 moles and, alternatively, about 6 moles of formaldehyde. The dispersant may be included in the solid surfactant composite in an amount, without limitation, of from about 10% to about 90% by weight of the solid surfactant composite. By way of example, the dispersant may be included in an amount of from about 10%, about 20%, about 30%, about 40%, about 50%, about 60%, about 70%, about 80%, or about 90% by weight of the solid surfactant composite.

Optionally, the solid surfactant composite may include a defoaming agent. The defoaming agent may be include in the solid surfactant composite in addition to, or separate from, the dispersant. Suitable defoaming agents may include compounds used in well operations to prevent a well treatment fluid from foaming during mixing and pumping. Without limitation, suitable defoaming agents may include oil-based defoamers, oil-based defoamers bridged onto particulate carriers, water-based defoamers, silicone-based defoamers, alkylene-oxide based defoamers, alkyl polyacrylate based defoamers, and combinations thereof. Other defoamers may include polyol compositions, siloxanes such as polydimethyl siloxane, acetylenic diols, and combinations thereof. The defoaming agent may be included in the solid surfactant composite in an amount, without limitation, of from about 0.1% to about 20% by weight of the solid surfactant composite. By way of example, the defoaming agent may be included in an amount of from about 0.1%, about 5%, about 10%, about 15%, or about 20% by weight of the solid surfactant composite.

Without limitation, a solid surfactant composite may include an alcohol ethoxylate, a solid carrier comprising amorphous silica, a dispersant, and a defoaming agent. By way of example, the solid surfactant composite may include a $C_8$ to $C_{12}$ alcohol substituted with about 4 moles to about 8 moles of ethylene oxide, amorphous silica, a sulfonated naphthalene formaldehyde condensate, and a siloxane. By way of further example, the solid surfactant composite may include isodecyl alcohol substituted with 6 moles of ethylene oxide, amorphous silica, naphthalene sulfonate condensed with 6 moles of formaldehyde, and a polydimethyl siloxane.

Without limitation, a solid surfactant composite may include an alcohol ethoxylate, a solid carrier comprising calcium silicate, a dispersant, and a defoaming agent. By way of example, the solid surfactant composite may include a $C_8$ to $C_{12}$ alcohol substituted with about 4 moles to about 8 moles of ethylene oxide, amorphous silica, a sulfonated naphthalene formaldehyde condensate, and a siloxane. By way of further example, the solid surfactant composite may include isodecyl alcohol substituted with 6 moles of ethylene oxide, amorphous silica, naphthalene sulfonate condensed with 6 moles of formaldehyde, and a polydimethyl siloxane.

Without limitation, a solid surfactant composite may include an alcohol ethoxylate, a solid carrier, a dispersant, and a defoaming agent. By way of example, the solid surfactant composite may include a $C_{12}$ to $C_{14}$ alcohol substituted with about 10 moles to about 14 moles of ethylene oxide, amorphous silica, diatomaceous earth, a sulfonated naphthalene formaldehyde condensate, and a siloxane. By way of further example, the solid surfactant composite may include isotridecyl alcohol substituted with 12 moles ethylene oxide, amorphous silica, diatomaceous earth, naphthalene sulfonate condensed with 6 moles of formaldehyde, and a polydimethyl siloxane.

Without limitation, a solid surfactant composite may include an alcohol ethoxylate, a solid carrier, a dispersant, and a defoaming agent. By way of example, the solid surfactant composite may include a $C_{12}$ to $C_{14}$ alcohol substituted with about 10 moles to about 14 moles of ethylene oxide, calcium silicate, a sulfonated naphthalene formaldehyde condensate, and a siloxane. By way of further example, the solid surfactant composite may include isotridecyl alcohol substituted with 12 moles ethylene oxide, amorphous silica, diatomaceous earth, naphthalene sulfonate condensed with 6 moles of formaldehyde, and a polydimethyl siloxane.

The solid surfactant composite may be prepared by any suitable technique. By way of example, any combination of the components (e.g., water-wetting surfactant, solid carrier, dispersant, and/or defoaming agent) may be combined to form a mixture. The mixture may optionally include a carrier fluid such as water, a hydrocarbon, or an alcohol, for example. The mixture may be sprayed onto the solid carrier and dried to form the solid surfactant composite. Alternatively, the components may be individually sprayed and dried on the solid carrier to form the solid surfactant composite. Alternatively, the components may be deposited on the solid carrier by precipitation, evaporation, including under reduced pressure, and any other method of coating or encapsulation of polymers onto solid substrates.

Without limitation, the solid surfactant composite may be used in a spacer fluid. A spacer fluid may include the solid surfactant composite and a base fluid. When added to the base fluid, the water-wetting surfactant on the solid surfactant composite may generally dissolve, with resulting release of the water-wetting surfactant into the base fluid. The solid surfactant composite may be included in the spacer fluid in an amount sufficient for a particular application. Without limitation, the solid surfactant composite may be added to the spacer fluid in an amount in a range of from about 0.1% to about 20% by weight of the spacer fluid and, alternatively, from about 1% to about 5% by weight. For example, the solid surfactant composite may be present in an amount of about 0.1%, about 1%, about 2%, about 4%, about 6%, about 8%, about 10%, about 15%, or about 20% by weight of the spacer fluid.

The base fluid may be an oil-base fluid or aqueous-base fluid. Examples of aqueous-base fluids may include fresh water, salt water (e.g., water containing one or more dissolved salts), brine, seawater, or any combination thereof. Examples of suitable oil-base fluids may include water-in-oil emulsions. The base fluid may be used to prepare a spacer fluid that is not emulsified. Without limitation, the base fluid may be included in the spacer fluids in an amount in the range of from about 15% to about 99.9% by weight of the spacer fluid and, alternatively, from about 25% to about 85% by weight of the spacer fluid. For example, the base fluid may be present in an amount of about 15%, about 20%, about 30%, about 40%, about 50%, about 60%, about 70%, about 80%, about 90%, about 99%, or about 99% by weight of the spacer fluid.

The spacer fluids generally should have a density suitable for a particular application. Without limitation, the spacer fluids may have a density in the range of from about 4 pounds per gallon ("ppg") to about 24 ppg, in the range of about 4 ppg to about 17 ppg, or in the range of about 8 ppg to about 13 ppg. Without limitation, the spacer fluids may be foamed or unfoamed or include other means to reduce their densities known in the art, such as lightweight additives.

Optionally, the spacer fluid may include a solid particulate additive. The solid particulate additive may be included in the spacer fluid as desired to perform a particular function. By way of example, the solid particulate additive may be included in the spacer fluid to weight the fluid to a desired density, assist in well cleaning by abrasive action in the wellbore, and/or as a viscosifier. Suitable solid particulate additives may include, without limitation, weighting agents, vitrified shale, cement kiln dust, silica flour, bentonite, volcanic glass, natural glass, fly ash, aluminosilicates, and combinations thereof. Weighting agents are typically materials may be used to increase the density of a well treatment fluid, such as a spacer fluid, and may have a specific gravity of about 2 or higher (e.g., about 2, about 4, etc.). Examples of weighting agents that may be used include, but are not limited to, hematite, hausmannite, barite, calcium carbonate, and combinations thereof. Without limitation, the solid particulate additive may be included in the spacer fluids in an amount in the range of from about 10% to about 85% by weight of the spacer fluid. For example, the solid particulate additive may be present of about 10%, about 20%, about 30%, about 40%, about 50%, about 60%, about 70%, about 80%, or about 85% by weight of the spacer fluid.

Without limitation, the solid particulate additive and the solid surfactant composite may be dry blended prior to combination with the base fluid to form the spacer fluid. This dry blend may be prepared offsite and then transported to the well site, for example, where it may be combined with the base fluid. By dry blending of the solid particulate additive and the solid surfactant, preparation of the spacer fluid may be simplified as only one solid additive may need to be included in the spacer fluid. In addition, costs may be reduced as transporting of multiple individual solid additives may not be needed if all the solid additives for the spacer fluid are included in the dry blend. The dry blend may include the solid particulate additive (or additives) in an amount of from about 80% to about 99.9%, alternatively, from about 90% to about 99.9%, and alternatively, from about 95% to about 99% by weight of the dry blend. The dry blend may include the solid surfactant composite in an amount of from about 0.1% to about 20%, alternatively, from about 0.1% to about 10%, and alternatively, from about 1% to about 5% by weight of the dry blend.

A wide variety of additional additives may be included in the spacer fluids as deemed appropriate by one skilled in the art, with the benefit of this disclosure. Examples of such additives include, but are not limited to: viscosifying agents (e.g., clays, hydratable polymers, hydroxyl ethyl cellulose, diutan, welan gum, xanthan gum), fluid loss control additives, lost circulation materials, filtration control additives, dispersants, foaming additives, defoamers, corrosion inhibitors, scale inhibitors, and formation conditioning agents.

Suitable spacer fluids may be prepared in accordance with any suitable technique. Without limitation, the desired quantity of water may be introduced into a mixer (e.g., a cement blender) followed by the dry blend. Without limitation, the dry blend may include the solid surfactant composite and the solid particulate additive, as described herein. Additional liquid additives, if any, may be added to the water as desired prior to, or after, combination with the dry blend. This mixture may be agitated for a sufficient period of time to form a pumpable slurry. By way of example, pumps may be used for delivery of this pumpable slurry into the wellbore. As will be appreciated, the spacer fluid and/or the dry blend may be prepared at the well site or prepared offsite and then transported to the well site. If prepared offsite, the dry blend and/or spacer fluid may be transported to the well site using any suitable mode of transportation, including, without limitation, a truck, railcar, barge, or the like. Alternatively, the spacer fluid and/or dry blend may be formulated at the well site, for example, where the components of the spacer fluid and/or dry blend may be delivered from a transport (e.g., a vehicle or pipeline) and then mixed prior to placement downhole.

With limitation, the spacer fluid (as described herein) may be used for displacing a first fluid from a wellbore, the wellbore penetrating a subterranean formation. The method may include combining components comprising a solid surfactant composite, solid particulate additive, and/or a base fluid to provide a spacer fluid. One or more optional additives may also be included in the spacer fluid as discussed herein. The method may further include introducing the spacer fluid into the wellbore to displace at least a portion of the first fluid from the wellbore. Without limitation, the spacer fluid may displace the first fluid from a wellbore annulus, such as the annulus between a pipe string and the subterranean formation or between the pipe string and a larger conduit. Non-limiting examples of the first fluid displaced by the spacer fluid may include a drilling fluid. By way of example, the spacer fluid may be used to displace the drilling fluid from the wellbore. In addition to displacement of the drilling fluid from the wellbore, the spacer fluid may also remove the drilling fluid from the walls of the wellbore. Additional steps in the method may include, without limitation, introducing a pipe string into the wellbore, introducing a cement composition into the wellbore with the spacer fluid separating the cement composition and the first fluid.

As described herein, the spacer fluid may prevent the cement composition from contacting the first fluid, such as a drilling fluid. The spacer fluid may also remove the drilling fluid, dehydrated/gelled drilling fluid, and/or filter cake solids from the wellbore in advance of the cement composition. Removal of these compositions from the wellbore may enhance bonding of the cement composition to surfaces in the wellbore.

The displaced drilling fluid may include, for example, any number of fluids, such as solid suspensions, mixtures, and emulsions. A non-limiting example of a suitable drilling fluid may include an oil-based drilling fluid. An example of a suitable oil-based drilling fluid includes an invert emulsion. Without limitation, the oil-based drilling fluid may include an oleaginous fluid. Examples of suitable oleaginous fluids that may be included in the oil-based drilling fluids include, but are not limited to, α-olefins, internal olefins, alkanes, aromatic solvents, cycloalkanes, liquefied petroleum gas, kerosene, diesel oils, crude oils, gas oils, fuel oils, paraffin oils, mineral oils, low-toxicity mineral oils, olefins, esters, amides, synthetic oils (e.g., polyolefins), polydiorganosiloxanes, siloxanes, organosiloxanes, ethers, dialkylcarbonates, hydrocarbons, and combinations thereof.

The cement composition introduced into the wellbore may include hydraulic cement and water. A variety of hydraulic cements may be utilized including, but not limited to, those comprising calcium, aluminum, silicon, oxygen, iron, and/or sulfur, which set and harden by reaction with water. Suitable hydraulic cements include, but are not limited to, Portland cements, pozzolana cements, gypsum cements, high alumina content cements, slag cements, silica cements, and combinations thereof. In certain embodiments, the hydraulic cement may include a Portland cement. In some embodiments, the Portland cements may include cements classified as Classes A, C, H, or G cements according to American Petroleum Institute, *API Specification for Materials and Testing for Well Cements*, API Specification 10, Fifth Ed., Jul. 1, 1990. In addition, in some embodiments, the hydraulic cement may include cements classified as ASTM Type I, II, or III.

As will be appreciated, the solid surfactant composite may be used in a wide variety of subterranean operations, including well cementing operations. An example method may include providing a solid surfactant composite comprising a water-wetting surfactant and a solid carrier; mixing components comprising the solid surfactant composite and a base fluid to provide a spacer fluid; and introducing a spacer fluid into a wellbore such that the spacer fluid displaces a drilling fluid in the wellbore. The solid surfactant composite may be spray dried. The solid surfactant composite may further include at least one additive selected from the group consisting of a dispersant, a defoaming agent, and any combination thereof. The water-wetting surfactant includes at least one surfactant selected from the group consisting of an alcohol ethoxylate, an alcohol ethoxysulfate, an alkyl phenol ethoxylate, a glycol ether, and any combination thereof. The water-wetting surfactant may include an alcohol ethoxylate, wherein the alcohol ethoxylate includes $C_8$ to $C_{12}$ alcohol ethoxylated with about 4 moles to about 8 moles of ethylene oxide. The solid carrier may include amorphous silica, and wherein the solid surfactant composite further includes a naphthalene sulfonate formaldehyde condensate and a polydimethyl siloxane. The water-wetting surfactant may include an alcohol ethoxylate, wherein the alcohol ethoxylate includes $C_{12}$ to $C_{14}$ alcohol ethoxylated with about 10 moles to about 14 moles of ethylene oxide. The solid carrier may include amorphous silica and diatomaceous earth, and wherein the solid surfactant composite further includes a naphthalene sulfonate formaldehyde condensate and a polydimethyl siloxane. The components mixed to prepare the spacer fluid may further include a solid particulate additive, and the mixing comprises mixing a dry blend comprising the solid surfactant composite and the solid particulate additive with the base fluid. The solid particulate additive includes at least one solid material selected from the group consisting of a weighting agent, vitrified shale, cement kiln dust, silica flour, bentonite, natural glass, fly ash, volcanic glass, hematite, hausmannite, barite, calcium carbonate, aluminosilicates, and any combination thereof. The base fluid may include an aqueous-base fluid selected from the group consisting of fresh water, salt water, brine, seawater, and any combination thereof. The spacer fluid may not be emulsified. The spacer fluid may be introduced into a wellbore annulus.

A composition may be provided that includes a solid surfactant composite comprising a water-wetting surfactant and a solid carrier; and a solid particulate additive dry blended with the solid surfactant composite. The solid surfactant composite may be spray dried. The solid surfactant composite may further include at least one additive selected from the group consisting of a dispersant, a defoaming agent, and any combination thereof. The water-wetting surfactant includes at least one surfactant selected from the group consisting of an alcohol ethoxylate, an alcohol ethoxysulfate, an alkyl phenol ethoxylate, a glycol ether, and any combination thereof. The water-wetting surfactant may include an alcohol ethoxylate, wherein the alcohol ethoxylate includes $C_8$ to $C_{12}$ alcohol ethoxylated with about 4 moles to about 8 moles of ethylene oxide. The solid carrier may include amorphous silica, and wherein the solid surfactant composite further includes a naphthalene sulfonate formaldehyde condensate and a polydimethyl siloxane. The water-wetting surfactant may include an alcohol ethoxylate, wherein the alcohol ethoxylate includes $C_{12}$ to $C_{14}$ alcohol ethoxylated with about 10 moles to about 14 moles of ethylene oxide. The solid carrier may include amorphous silica and diatomaceous earth, and wherein the solid surfactant composite further includes a naphthalene sulfonate formaldehyde condensate and a polydimethyl siloxane. The solid particulate additive includes at least one solid material selected from the group consisting of a weighting agent, vitrified shale, cement kiln dust, silica flour, bentonite, natural glass, fly ash, hematite, volcanic glass, hausmannite, barite, calcium carbonate, and any combination thereof.

A system may be provided that may include a solid surfactant composite for use in a spacer fluid, wherein the solid surfactant composite includes a water-wetting surfactant and a solid carrier; a base fluid for use in the spacer fluid; and a pump fluid fluidly coupled to a tubular in fluid communication with a wellbore, wherein the tubular is configured to convey the spacer fluid to the wellbore. The system may further include a vessel disposed upstream of the pump, wherein the spacer fluid is disposed in the vessel. The solid surfactant composite may be spray dried. The solid surfactant composite may further include at least one additive selected from the group consisting of a dispersant, a defoaming agent, and any combination thereof. The water-wetting surfactant includes at least one surfactant selected from the group consisting of an alcohol ethoxylate, an alcohol ethoxysulfate, an alkyl phenol ethoxylate, a glycol ether, and any combination thereof. The water-wetting surfactant may include an alcohol ethoxylate, wherein the alcohol ethoxylate includes $C_8$ to $C_{12}$ alcohol ethoxylated with about 4 moles to about 8 moles of ethylene oxide. The solid carrier may include amorphous silica, and wherein the solid surfactant composite further includes a naphthalene sulfonate formaldehyde condensate and a polydimethyl siloxane. The water-wetting surfactant may include an alcohol ethoxylate, wherein the alcohol ethoxylate includes $C_{12}$ to $C_{14}$ alcohol ethoxylated with about 10 moles to about 14 moles of ethylene oxide. The solid carrier may include amorphous silica and diatomaceous earth, and wherein the solid surfactant composite further includes a naphthalene sulfonate formaldehyde condensate and a polydimethyl siloxane. The components mixed to prepare the spacer fluid may further include a solid particulate additive, and the mixing comprising mixing a dry blend comprising the solid surfactant and the solid particulate additive with the base fluid. The solid particulate additive includes at least one solid material selected from the group consisting of a weighting agent, vitrified shale, cement kiln dust, silica flour, bentonite, natural glass, volcanic glass, fly ash, hematite, hausmannite, barite, calcium carbonate, and any combination thereof. The base fluid may include an aqueous-base fluid selected from the group consisting of fresh water, salt water, brine, seawater, and any combination thereof. The spacer fluid may not be emulsified. The spacer fluid may be introduced into a wellbore annulus.

Without limitation, methods of using the spacer fluids described herein in well cementing will now be described in more detail with reference to FIGS. 1-3. Any of the embodiments of a spacer fluid described herein may apply in the context of FIGS. 1-3. FIG. 1 illustrates a system 100 that may be used for preparation and delivery of a spacer fluid downhole. It should be noted that while FIG. 1 generally depicts a land-based operation, those skilled in the art will readily recognize that the principles described herein are equally applicable to subsea operations that employ floating or sea-based platforms and rigs, without departing from the scope of the disclosure. As illustrated on FIG. 1, the system 100 may include a vessel 105 and a pump 110. The pump 110 may be positioned downstream of the vessel 105 and may be fluidly coupled to a tubular 115 that is in fluid communication with the wellbore 120. The tubular 115 may be configured to circulate or otherwise deliver the spacer fluid to the wellbore 120. The tubular 115 may be included, for example, of one or more different pipes that extend into the wellbore 120. The pump 110 may be, for example, one or more high pressure or low pressure pumps, which may be depend on, without limitation, the viscosity and density of the spacer fluid. Without limitation, the pump 110 may draw the spacer fluid from the vessel 105, elevate the spacer fluid to an appropriate pressure, and then introduce the spacer fluid to the tubular 115 for delivery downhole. Without limitation, the vessel 105 and pump 110 may be disposed on one or more cement trucks, for example. While not illustrated, system 100 may further include a recirculating mixer, a batch mixer and/or a jet mixer, which may be used for example, in preparation and/or storage of the spacer fluid. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

FIG. 2 depicts one or more subterranean formations 200 penetrated by wellbore 120 with drilling fluid 205 disposed therein. The drilling fluid 205 may include the example drilling fluids disclosed herein as well as other suitable drilling fluids. While the wellbore 120 is shown extending generally vertically into the one or more subterranean formations 200, the principles described herein are also applicable to wellbores that extend at an angle through the one or more subterranean formations 200, such as horizontal and slanted wellbores. As illustrated, the wellbore 120 includes walls 210. Without limitation, a surface casing 215 may be cemented to the walls 210 of the wellbore 120 by cement sheath 220. Without limitation, one or more additional pipe strings (e.g., intermediate casing, production casing, liners, etc.), shown here as casing 225 may also be disposed in the wellbore 120. As illustrated, there is a wellbore annulus 230 formed between the casing 225 and the walls 210 of the wellbore 120 (and/or a larger conduit such as the surface casing 215). While not shown, one or more centralizers may be attached to the casing 225, for example, to centralize the casing 225 in the wellbore 120 prior to and during the cementing operation.

As illustrated, a cement composition 235 may be introduced into the wellbore 120. For example, the cement composition 235 may be pumped down the interior of the casing 225. A pump (e.g. pump 110 on FIG. 1) may be used for delivery of the cement composition 235 into the wellbore 120. It may be desired to circulate the cement composition 235 in the wellbore 120 until it is in the wellbore annulus 230. The cement composition 235 may include the example cement compositions disclosed herein as well as other suitable cement compositions. While not illustrated, other techniques may also be utilized for introduction of the cement composition 235. By way of example, reverse circulation techniques may be used that include introducing the cement composition 235 into the wellbore 120 by way of the wellbore annulus 230 instead of through the casing 225.

Without limitation, the spacer fluid 240 may be used to separate the drilling fluid 205 from the cement composition 235. The previous description with reference to FIG. 1 for preparation of a spacer fluid may be used for delivery of the spacer fluid 240 into the wellbore 120. Moreover, a pump (e.g., pump 110 on FIG. 1) may also be used for delivery of the spacer fluid 240 into the wellbore 120. The spacer fluid 240 may be used with the cement composition 235 for displacement of the drilling fluid 205 from the wellbore 120 as well as preparing the wellbore 120 for the cement composition 235. By way of example, the spacer fluid 240 may function, inter alia, to remove the drilling fluid 205, drilling fluid 205 that is dehydrated/gelled, and/or filter cake solids from the wellbore 120 in advance of the cement composition 235. While not shown, one or more plugs or other suitable devices may be used to physically separate the drilling fluid 205 from the spacer fluid 240 and/or the spacer fluid 240 from the cement composition 235.

Referring now to FIG. 3, the drilling fluid 205 has been displaced from the wellbore annulus 230. As illustrated, the spacer fluid 240 and the cement composition 235 may be allowed to flow down the interior of the casing 225 through the bottom of the casing 225 (e.g., casing shoe 300) and up around the casing 225 into the wellbore annulus 230, thus displacing the drilling fluid 205. At least a portion of the displaced drilling fluid 205 may exit the wellbore annulus 230 via a flow line 125 and be deposited, for example, in one or more retention pits 130 (e.g., a mud pit), as shown in FIG. 1. Turning back to FIG. 3, the cement composition 235 may continue to be circulated until it has reached a desired location in the wellbore annulus 230. The spacer fluid 240 (or a portion thereof) and/or the cement composition 235 may be left in the wellbore annulus 230. As illustrated, the spacer fluid 240 may be disposed in the wellbore annulus 230 above or on top of the cement composition 235. The cement composition 235 may set in the wellbore annulus 230 to form an annular sheath of hardened, substantially impermeable material (i.e., a cement sheath) that may support and position the casing 225 in the wellbore 120.

Statement 1. A method of preparing a solid surfactant composite including: coating a liquid water-wetting surfactant on a solid carrier; and drying the solid carrier to produce the solid surfactant composite.

Statement 2. The method of statement 1 wherein the step of coating includes dry blending or spraying.

Statement 3. The method of any of statements 1-2 wherein the step of coating includes spraying and wherein the method further includes spraying at least one of a dispersant, a defoamer, or both.

Statement 4. The method of any of statements 1-3 wherein the liquid water-wetting surfactant, the dispersant, and the defoamer are individually sprayed on the solid carrier or sprayed as any mixture thereof.

Statement 5. The method of any of statements 1-4 further comprising:

mixing the liquid water-wetting surfactant, the dispersant, and the defoamer with a carrier fluid prior to the step of spraying.

Statement 6. The method of any of statements 1-5 wherein the liquid water-wetting surfactant includes at least one surfactant selected from the group consisting of an alcohol ethoxylate, an alcohol ethoxysulfate, an alkyl phenol ethoxylate, a glycol ether, or any combination thereof.

Statement 7. The method of any of statements 1-6 wherein the solid carrier includes calcium silicate.

Statement 8. The method of any of statements 1-7 wherein the solid carrier includes at least one of as fly ash, natural glass, metal silicates, aluminosilicates, alkali silicates, alkali earth silicates, metal carbonates, alkali carbonates, alkali earth carbonates, synthetic glass, biomass ash, diatomaceous earth, cement kiln dust, lime kiln dust, Portland cement, non-Portland cement, aluminate cement, and combinations thereof.

Statement 9. A method comprising: introducing a spacer fluid into a wellbore, the spacer fluid comprising a solid surfactant composite; and displacing a fluid in the wellbore using the spacer fluid.

Statement 10. The method of statement 9 wherein the solid surfactant composite includes: a liquid water-wetting surfactant disposed on a surface of a solid carrier; and, optionally, a dispersant, a defoamer, or both disposed on a surface of the solid carrier.

Statement 11. The method of any of statements 9-10 wherein the solid surfactant composite is prepared by coating a liquid water-wetting surfactant, and, optionally, the dispersant, the defoamer, or both on the solid carrier and drying the drying the solid carrier to produce the solid surfactant composite.

Statement 12. The method of any of statements 9-11 wherein the solid carrier includes calcium silicate.

Statement 13. The method of any of statements 9-12 wherein the solid carrier includes at least one of as fly ash, natural glass, metal silicates, aluminosilicates, alkali silicates, alkali earth silicates, metal carbonates, alkali carbonates, alkali earth carbonates, synthetic glass, biomass ash, diatomaceaous earth, cement kiln dust, lime kiln dust, Portland cement, non-Portland cements, aluminate cement, and combinations thereof.

Statement 14. The method of any of statements 9-13 wherein the liquid water-wetting surfactant includes at least one surfactant selected from the group consisting of an alcohol ethoxylate, an alcohol ethoxysulfate, an alkyl phenol ethoxylate, a glycol ether, and any combination thereof.

Statement 15. The method of any of statements 9-14 wherein liquid the water-wetting surfactant includes an alcohol ethoxylate, wherein the alcohol ethoxylate includes $C_8$ to $C_{12}$ alcohol ethoxylated with about 4 moles to about 8 moles of ethylene oxide.

Statement 16. The method of any of statements 9-15 wherein the spacer fluid further comprises an aqueous-base fluid selected from the group consisting of fresh water, salt water, brine, seawater, and any combination thereof.

Statement 17. The method of any of statements 9-16 further comprising preparing the spacer fluid, the preparing comprising: mixing a dry blend comprising the solid surfactant and a solid particulate additive with am aqueous-base fluid.

Statement 18. A method comprising: introducing a spacer fluid into a wellbore, the spacer fluid comprising a solid surfactant composite, the solid surfactant composite comprising a surfactant coated on a calcium silicate solid carrier; and displacing a fluid in the wellbore using the spacer fluid, wherein the solid surfactant composite is prepared by coating a liquid water-wetting surfactant, on the solid carrier and drying the drying the solid carrier to produce the solid surfactant composite.

Statement 19. The method of statement 18 wherein the water-wetting surfactant comprises at least one surfactant selected from the group consisting of an alcohol ethoxylate, an alcohol ethoxysulfate, an alkyl phenol ethoxylate, a glycol ether, or any combination thereof.

Statement 20. The method of any of statements 18-19 wherein the solid surfactant further comprises at least one of a dispersant, a defoamer, or both coated on the calcium silicate solid carrier.

The exemplary spacer fluid disclosed herein may directly or indirectly affect one or more components or pieces of equipment associated with the preparation, delivery, recapture, recycling, reuse, and/or disposal of the sugar cane ash and associated spacer fluids. For example, the spacer fluid (or components thereof) may directly or indirectly affect one or more mixers, related mixing equipment, mud pits, storage facilities or units, composition separators, heat exchangers, sensors, gauges, pumps, compressors, and the like used generate, store, monitor, regulate, and/or recondition the exemplary sugar cane ash and fluids containing the same. The disclosed spacer fluid (or components thereof) may also directly or indirectly affect any transport or delivery equipment used to convey the spacer fluid (or components thereof) to a well site or downhole such as, for example, any transport vessels, conduits, pipelines, trucks, tubulars, and/or pipes used to compositionally move the spacer fluid (or components thereof) from one location to another, any pumps, compressors, or motors (e.g., topside or downhole) used to drive the spacer fluid (or components thereof), into motion, any valves or related joints used to regulate the pressure or flow rate of the spacer fluid, and any sensors (i.e., pressure and temperature), gauges, and/or combinations thereof, and the like. The disclosed spacer fluid may also directly or indirectly affect the various downhole equipment and tools that may come into contact with the spacer fluid such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

The preceding description provides various embodiments of the spacer fluids containing different additives and concentrations thereof, as well as methods of using the spacer fluids. It should be understood that, although individual embodiments may be discussed herein, the present disclosure covers all combinations of the disclosed embodiments, including, without limitation, the different additive combinations, additive concentrations, and fluid properties.

It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present disclosure. If there is any conflict in the usages of a word or term in this specification and one or more patent(s) or other documents that may be incorporated herein by reference, the definitions that are consistent with this specification should be adopted.

What is claimed is:

1. A method of preparing a solid surfactant composite comprising:
   spraying a mixture comprising a liquid water-wetting surfactant comprising an alcohol ethoxylate, a dispersant comprising naphthalene sulfonate, a defoamer comprising polydimethyl siloxane, and a carrier fluid comprising an alcohol on a solid carrier comprising calcium silicate as a single liquid coating; and
   after the step of spraying, drying the solid carrier and the single liquid coating to produce the solid surfactant composite, wherein after drying, the solid surfactant composite comprises dried water-wetting surfactant, dried dispersant, and dried defoamer.

2. The method of claim 1, further comprising:
   mixing the liquid water-wetting surfactant, the dispersant, and the defoamer with the carrier fluid prior to the step of spraying.

3. The method of claim 2, wherein the carrier fluid further comprises at least one fluid selected from a list consisting of water, a hydrocarbon, and any combination thereof.

4. The method of claim 1, wherein the liquid water-wetting surfactant further comprises at least one surfactant selected from the group consisting of an alcohol ethoxysulfate, an alkyl phenol ethoxylate, a glycol ether, and any combination thereof.

5. The method of claim 1, wherein the calcium silicate is present in the solid surfactant composite in an amount of about 0.1 wt. % to about 10 wt. % by weight of the solid surfactant composite.

6. The method of claim 1, wherein the solid surfactant composite has a mean diameter of about 5 microns to about 1500 microns.

7. The method of claim 1, wherein the liquid water-wetting surfactant comprises alcohol ethoxylate, wherein the alcohol ethoxylate is present in an amount of about 15 wt. % to about 30 wt. % by weight of the solid surfactant composite.

8. The method of claim 1, wherein the liquid water-wetting surfactant further comprises alcohol ethoxylate sulfate ammonium salt.

9. The method of claim 1, wherein the liquid water-wetting surfactant further comprises a $C_8$ to $C_{12}$ alcohol ethoxylated with about 4 moles to about 8 moles of ethylene oxide.

10. The method of claim 1, wherein the solid carrier further comprises at least one solid carrier selected from the group consisting of fly ash, natural glass, metal silicates, amorphous silica, aluminosilicates, alkali silicates, alkali earth silicates, metal carbonates, alkali carbonates, alkali earth carbonates, synthetic glass, biomass ash, diatomaceous earth, cement kiln dust, lime kiln dust, Portland cement, non-Portland cement, aluminate cement, and any combination thereof.

11. The method of claim 1, wherein the liquid water-wetting surfactant further comprises at least one surfactant selected from the group consisting of poly(oxy-1,2,-ethanediyl) alpha-sulfo-omega-(dodecyloxy) ammonium salt, poly(oxy-1,2-ethanediyl) alpha-sulfo-omega-(tetradecyloxy) ammonium salt, C9-C11 alkyl oligomeric d-glucopyranoside, and any combination thereof.

12. The method of claim 1, wherein the dispersant further comprises at least one dispersant selected from the group consisting of a sulfonated polymer, a melamine sulfonate, a sulfonated melamine formaldehyde condensate, a sulfonated naphthalene formaldehyde condensate, sulfonate acetone formaldehyde condensate, ethoxylated polyacrylates; and any combination thereof.

13. The method of claim 1, wherein the defoamer comprises at least one defoamer selected from the group consisting of oil, silicone, an alkylene-oxide, an alkyl polyacrylate, polyol, siloxane, acetylenic diol, and any combination thereof.

* * * * *